United States Patent
Hagenmeyer et al.

(10) Patent No.: US 6,754,971 B1
(45) Date of Patent: Jun. 29, 2004

(54) CENTERING DEVICE FOR FLAT COMPONENTS, ESPECIALLY GLASS PANELS

(75) Inventors: Cord Hagenmeyer, Mindelheim (DE); Oliver Weiss, Mindelheim (DE); Alois Hoyer, Mindelheim (DE)

(73) Assignee: Fa. Oskar Braunsberger, Mindelheim (DE)

( * ) Notice: Subject to any disclaimer, the term of this patent is extended or adjusted under 35 U.S.C. 154(b) by 0 days.

(21) Appl. No.: 09/744,769

(22) PCT Filed: Jul. 23, 1999

(86) PCT No.: PCT/EP99/05287

§ 371 (c)(1),
(2), (4) Date: Mar. 19, 2001

(87) PCT Pub. No.: WO00/06361

PCT Pub. Date: Feb. 10, 2000

(30) Foreign Application Priority Data

Jul. 25, 1998 (DE) .................................. 298 13 174 U

(51) Int. Cl.[7] .............................................. G01D 21/00
(52) U.S. Cl. .............................. 33/520; 33/644; 33/573; 269/254
(58) Field of Search .................... 33/520, 600, 613, 33/644, 670, 673, 677, 568, 573, 549, 551, 552; 269/43, 249, 254; 264/271.1; 403/327; 29/467, 271; 296/187.02

(56) References Cited

U.S. PATENT DOCUMENTS

| | | | | |
|---|---|---|---|---|
| 854,992 A | * | 5/1907 | Ehni ............................ | 33/520 |
| 2,559,861 A | | 7/1951 | Fay | |
| 2,999,282 A | * | 6/1961 | Herman ......................... | 33/520 |
| 3,630,511 A | * | 12/1971 | Evans ............................ | 269/43 |
| 4,356,635 A | * | 11/1982 | Chung ........................... | 33/520 |
| 4,518,476 A | * | 5/1985 | Delony et al. ................. | 269/43 |
| 4,570,343 A | * | 2/1986 | Bell .............................. | 33/568 |
| 4,700,488 A | * | 10/1987 | Curti ............................. | 33/613 |
| 5,365,672 A | * | 11/1994 | Kato ............................. | 33/520 |
| 5,394,617 A | * | 3/1995 | Tucker .......................... | 33/644 |
| 5,527,023 A | * | 6/1996 | Starr ............................. | 269/43 |
| 5,533,853 A | * | 7/1996 | Wu .............................. | 269/290 |
| 5,836,080 A | * | 11/1998 | Inagaki et al. ................. | 33/568 |
| 6,088,922 A | * | 7/2000 | Melugin ........................ | 33/267 |
| 6,293,021 B1 | * | 9/2001 | Freitag et al. ................. | 33/644 |
| 6,318,798 B1 | * | 11/2001 | Bergmiller ............. | 296/187.02 |
| 2002/0020935 A1 | * | 2/2002 | Bergmiller .................. | 264/46.4 |

FOREIGN PATENT DOCUMENTS

| | | | | |
|---|---|---|---|---|
| DE | 32 27 014 | | 1/1984 | |
| JP | 60035211 A | * | 8/1983 | ................. 33/520 |
| JP | 61152353 A | * | 7/1986 | ................. 33/520 |
| JP | 63162210 A | | 12/1986 | |
| JP | 63191610 A | | 2/1987 | |
| JP | 63262515 | * | 4/1987 | ................. 33/520 |
| JP | 04069222 A | | 7/1990 | |

* cited by examiner

Primary Examiner—Diego Gutierrez
Assistant Examiner—Travis Reis
(74) Attorney, Agent, or Firm—Knobbe, Martens, Olson & Bear, LLP

(57) ABSTRACT

The aim of the invention is to create a centering device having a simple structure for flat components (3), especially glass panels, which at least along their lateral edges can be surrounded by a plastic frame (4) by injection/foaming or encapsulation. To this end the invention provides for the centering device (16) to be embodied by springs (18 and 19) having the same elastic constant which are positioned opposite each other and both engage the component (3).

15 Claims, 1 Drawing Sheet

US 6,754,971 B1

CENTERING DEVICE FOR FLAT COMPONENTS, ESPECIALLY GLASS PANELS

BACKGROUND OF THE INVENTION

1. Field of the Invention

The present invention relates to a centering device for flat components, glass panels in particular, which can be surrounded at least along their lateral edges by a synthetic frame by injection/foaming or encapsulation.

2. Description of the Related Art

Such components in the form of glass panels for sliding roofs, rear windows, front windows, side windows or similar components are being installed increasingly in vehicles. In this situation the glass panel inside the roof or window opening is as large as possible such that the synthetic frame enclosing the glass panel made of a thermoplastic synthetic material or polyurethane foam material should be as narrow as possible. This synthetic frame of the glass sliding roof also serves to fasten mountings such as brackets to which the drive mechanism for opening the glass sliding roof is hinged, in particular when the glass sliding roof is utilized as a wind-up or turn-up roof or side panels with fastenings.

Substantial significance is attached to fastening the synthetic frame together with the mountings, as the glass panel of the glass sliding roof is to be mounted flush with the roof surface for aerodynamic reasons. The synthetic frame is according provided essentially on the circumferential edge and on a narrow region on the underside only of the synthetic frame. Also, the synthetic frame functions as mounting for a circumferential seal to ensure reliable sealing here.

A circumferential groove is also generally provided on the synthetic frame for sealing purposes. Yet this arrangement requires a very precise foaming or extrusion tool, since the distance between groove floor and the glass panel contour at the four circumferential side edges of the synthetic frame can be a few millimeters only on account of the preferred narrow structure, such that very precise positioning of the component, in particular the glass panel inside the tool, is required during manufacturing. The centering device required for fabrication should also not interfere with the run of foam of the synthetic material during the extrusion or foaming procedure so that the contact surfaces do not need to be oversized.

Furthermore, in the case of previous manufacturing processes employing customary manual centering in the foaming tool there has been the drawback of a higher cycle time and the high risk of accident. Additionally, the dimensional accuracy with use of mechanically coupled limit stops through the plurality of tools is often inadequate, in particular when elongations and thus certain dimensional inaccuracies can occur in the tool and with heat accumulation during manufacture. Because of this burrs, which require a large degree of retouching work, can occur at the edges of the synthetic frame.

SUMMARY OF THE INVENTION

The objective of the invention is accordingly to create a simply structured centering device for flat components, in particular for a glass panel, which avoids the present disadvantages and lowers tool costs in particular, as well as offering greater dimensional accuracy with less refinishing expense.

The synthetic frame for extruding/foaming can be manufactured simply and precisely centered by means of the proposed centering device. In particular, expensive mechanisms or couplings on the tool or for the centering device can be dispensed with in this case. The centering device is therefore essentially integrated into the foaming tool and exhibits a very simple structure. In addition, this effectively produces a very uniform run of foam, such that a complete wetting of the glass panel at the edges is attained. Also, the stability between the glass panel and the synthetic frame is consistently increased, such that the overall quality of the prefabricated part increases.

It is ensured in particular that the external contours of the component, in particular a glass sliding roof, are kept to exactly. This substantially lowers the expense for refinishing work on the external contour or deburring of the outer edges. In particular, with the simplest structure an exact relative assignment is achieved by centering the springs arranged in pairs, such that in a preferred embodiment of a glass sliding roof uniform seal installation and thus overall improved sealing of the roof opening is attained.

BRIEF DESCRIPTION OF THE DRAWINGS

An embodiment of the invention will now be explained and described hereinbelow in greater detail with reference to the diagrams, in which.

DETAILED DESCRIPTION OF THE PREFERRED EMBODIMENT

Figure 1:
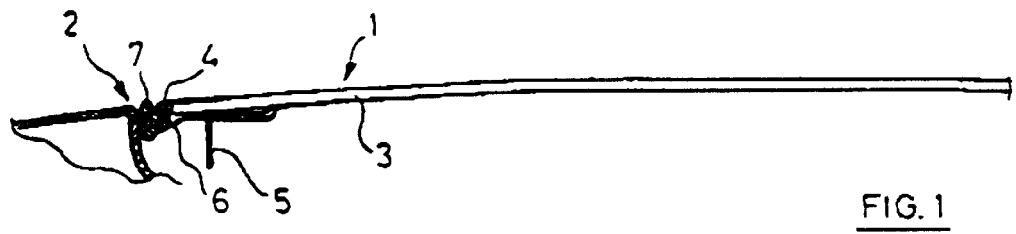
FIG. 1 is a general illustration of a sliding roof for vehicles with a glass panel as example of a flat component to be inserted into a tool.

FIG. 1 illustrates a glass sliding roof 1 as example for application for installation in a roof opening 2 of a vehicle, glass sliding roof 1 essentially comprises a glass panel (here as representatives example of a flat component 3) which is surrounded on the outer edge or lateral edges by a synthetic frame 4, preferably made of PU foam. This frame 4 is extruded or foamed in a foaming tool (cf. FIG. 2) on the outer edge of glass panel 3. Mountings 5, preferably angle plates, are also extruded at the same time, such that on the one hand the distortion resistance is increased and on the other hand fastening on the drive mechanism for sliding or raising glass sliding roof 1 is enabled. Provided on the outwards directed lateral edges of synthetic frame 4 in the plane of glass panel 3 is a circumferential groove 6, preferably T-shaped, for inserting a seal 7.

Figure 2:
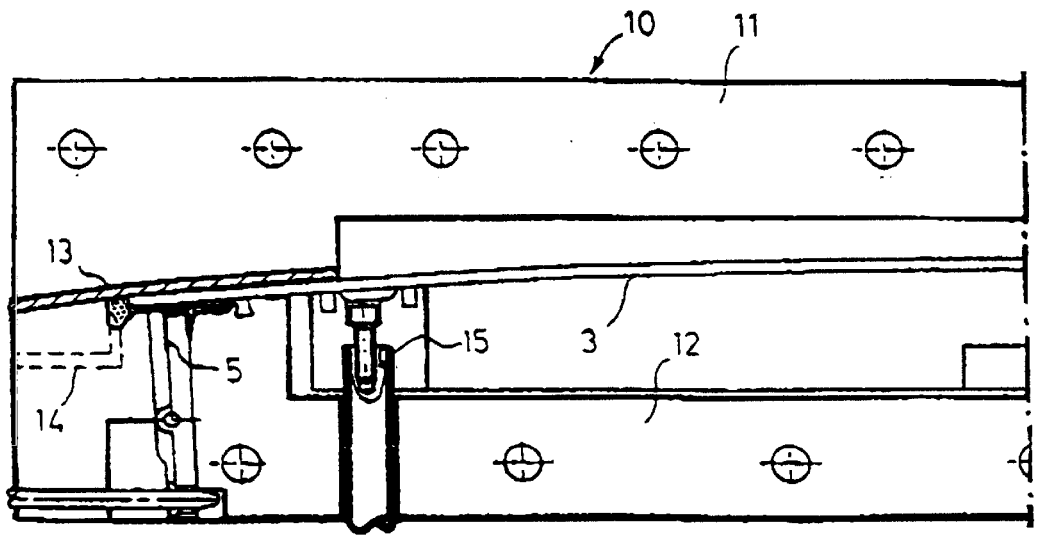
FIG. 2 shows the glass sliding roof according to FIG. 1 during manufacture in the foaming tool.

FIG. 2 diagrammatically illustrates corresponding foaming tool 10 comprising a tool upper section 11 and a tool lower section 12. Foaming tool 10 can also be rotated through 180° ('overend'), such that glass panel 3 might then be positioned concavely. As is evident from this, the die cavity on the external circumference of glass panel 3 for forming frame 4 is illustrated here in dotted lines and is formed favorably for flow, so as to ensure good mould filling. This is particularly essential, as glass panel 3 and mountings 5 in this embodiment are fastened by means of the contact surfaces only to frame 4. The die cavity for forming frame 4 illustrated here in dotted lines is to be sealed beneficially, preferably using a self-separating sealing plate 13 which reliably prevents the synthetic foam entering via one or preferably several injection apertures 14 from overflowing on the upper side of glass panel 3. The upper side of glass panel 3 is kept clean by this sealing plate 13 during the foaming process, such that there is practically no refinishing work required.

It is also evident that secure sealing against ejectors 15 provided further in is possible, ensuring secure filling of the die cavity with extruding of mountings 5. Further to this, it is evident that tool upper section 11 extends continuously outwards with sealing plate 13, such that various tool lower sections 12 can be used with same tool upper section 11. In a production facility this enables the manufacture of different variants of glass sliding rooves 1 with variously positioned mountings 5 using the same plunger-like tool upper section 11. Simply lifting tool upper section 11 or lowering tool lower section 12 suffices to remove finished glass sliding roof with frame 4, such that the cycle time is substantially reduced hereby.

Figure 3:
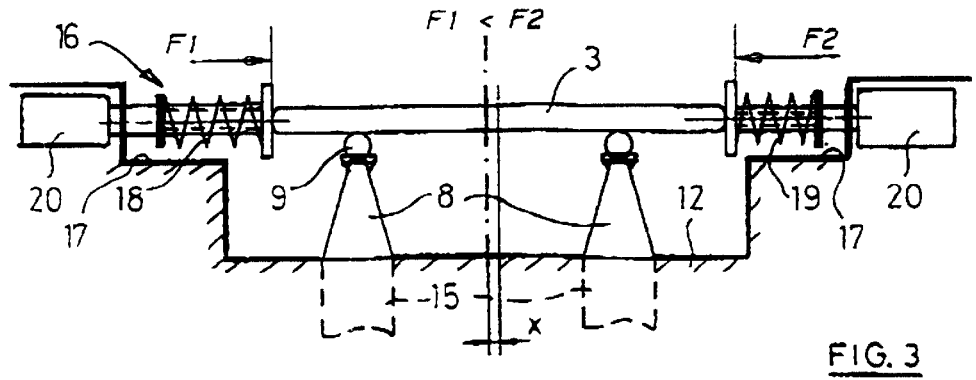
FIG. 3 is a diagrammatic illustration of a centering device.

FIG. 3 illustrates centering device 16 with springs 18 and 19 lying opposite one another in pairs, each of which is here set in to lateral depressions 17 of tool lower section 12. Said compression springs 18 and 19 are aligned substantially in the plane of flat component 3 and present an identical elastic constant. When glass panel 3 is positioned springs 18 and 19 lie with identical resilience F1 or F2 on the lateral edges of the component or glass panel 3, resulting in automatic centering on account of the spring deflection. This is valid also for components having a varying basic surface or width, so that the centering device can be used for glass panels 3 of varying width. Slight deviations in size can also be compensated for.

It is pointed out, however, that a gas spring element or other work storage can be used as centering device or spring 18, 19, whereby such are aligned with the edges somewhat parallel to the principal plane of glass panel 3. Glass panel 3 is held and centered between springs 18, 19 exerting the same force, whereby inserted component 3 is supported on a bearing device 8 which is equipped here with spherical bearing elements 9. This results in multi-point bearing, whereby bearing device 8 can be designed at the same time and/or partially as ejector 15, as is illustrated with dashed lines.

However, if component 3 or the glass panel is set eccentrically between springs 18 and 19, as is indicated by measurement 'x' between the center line of the tool marked in dot-dash lines and the center line of the component depicted in thin lines, then a stronger force F2 is exerted on spring 19 until equilibrium of forces F1=F2 by displacing component 3 by measurement 'x', resulting in the center lines matching up. It is understood that a second centering device 16 arranged offset by ca. 90° can be provided on the other side edge pair for creating this relative assignment in tool 10. For reciprocal actuation of centering elements 18, 19 on the longitudinal and transverse edges of a component 3 a separate, diagrammatically illustrated retraction device with tension elements 20 can be provided which extend in the manner of pistons to springs 18 and 19.

Respective tension element 20 for retracting springs 18, 19, in particular after insertion or lowering of component 3 into the shape nest of tool lower section 12, can thereby be formed by compressed air or hydraulic cylinder or screwjack assembly. After tension elements 20 are released and by means of the spring deflection the centering relative assignment is restored automatically by impact from springs 18, 19 arranged opposite one another in pairs and having identical elastic constant. Minimal tolerances in the manufacturing of components/glass panels 3 can be well compensated for, so that exact assignment between all components is produced overall. With the preferred embodiment of a glass sliding roof 1 positioning of frame 4 and thus sealing during installation into the vehicle against roof opening 2 (cf. FIG. 1) is improved. However, centering device 16 can also be used for large-surface foaming or encapsulating of components for any synthetic compound elements.

What is claimed is:

1. A centering device for flat components placed in a foaming tool, the device comprising:

springs having identical elastic constants, said springs positioned opposite one another and to engage opposite edges of said flat component, said springs also acting substantially in the plane of the flat components;

tension elements engaged with the springs so as to selectively retract the springs away from engagement with the opposite edges of the flat component; and at least one bearing support comprising bearings wherein the bearing support is arranged to directly support the flat components in said foaming tool for foaming at said opposite edges.

2. The centering device of claim 1, wherein said flat components comprise glass panels.

3. The centering device of claim 1, wherein said springs are arranged in pairs along the longitudinal edges of said component.

4. The centering device of claim 1, wherein said springs are arranged in pairs along the lateral edges of said component.

5. The centering device of claim 1, wherein the bearing supports are height adjustable.

6. The centering device of claim 5, wherein the upper side of said bearing comprises moving bearing elements.

7. The centering device of claim 5, wherein said bearing comprises roller elements.

8. The centering device of claim 5, wherein said bearing comprises a spherical bearing.

9. The centering device of claim 5, further comprising ejectors, wherein said bearing is formed on the upper side of said ejector.

10. The centering device of claim 1, wherein said foaming tool comprises recesses.

11. The centering device of claim 10, wherein said centering device is arranged in said recesses.

12. The centering device of claim 1, wherein said foaming tool is located near a separating plane.

13. The centering device of claim 1, wherein said tension elements comprises a screwjack assembly.

14. The centering device of claim 1, wherein said tension elements comprises a fluid cylinder.

15. A method for centering a flat component in a foaming tool, the method comprising:

placing opposite edges of said flat component between a pair of springs having identical elastic constants, wherein equal and opposite forces exerted by said springs substantially in the plane of the flat component positions said flat component at a predefined location; and tension elements engaged with the springs so as to selectively retract the springs away from the opposite edges of the flat component.

* * * * *

UNITED STATES PATENT AND TRADEMARK OFFICE
CERTIFICATE OF CORRECTION

PATENT NO. : 6,754,971 B1
DATED : June 29, 2004
INVENTOR(S) : Hagenmeyer et al.

It is certified that error appears in the above-identified patent and that said Letters Patent is hereby corrected as shown below:

Title page,
Item [73], Assignee, before "Mindelheim" insert -- Saulingstrasse 1-3, 87719 --.
Item [56], References Cited, U.S. PATENT DOCUMENTS,
delete "6/1961" and insert -- 9/1961 --.

Signed and Sealed this

Seventeenth Day of January, 2006

JON W. DUDAS
*Director of the United States Patent and Trademark Office*